Patented Sept. 5, 1944

2,357,717

UNITED STATES PATENT OFFICE 2,357,717

LARVICIDE

Wesley G. Bruce, Dallas, Tex.; dedicated to the free use of the People in the Territory of the United States No Drawing. Application October 16, 1941, Serial No. 415,173

1 Claim. (Cl. 167—22)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

This invention is concerned with insecticides, and its primary object is to provide an effective substance for the internal medication of domestic animals. It may be also employed as an anthelmintic, parasiticide, and a larvicide.

My invention consists of the oral administration to livestock of a common chemical for a novel and hitherto unknown purpose, more specifically for the control of horn flies (*Haematobia irritans* L.) in the feces of such medicated animals.

The horn fly is one of the important insect pests attacking cattle in the United States. These flies breed exclusively in cattle droppings, i. e., the eggs of the horn fly are deposited only on fresh cattle droppings and the horn fly larvae develop only in such media. Therefore, any substance which can be mixed with the cattle feed, or otherwise administered orally, and which will pass on out of the animal in the droppings, and render the droppings toxic to horn fly larvae will effect horn fly control. Obviously, such a substance must be non-toxic to the animal. Such a substance may also inhibit the development of other undesirable manure-inhabiting insects as houseflies (*Musca domestica*), stable flies (*Stomoxys calcitrans*), etc. Furthermore, since the substance is so toxic to horn fly larvae, it may be also toxic to certain gastro-intestinal parasites, such as ascarids and nodular worms in swine, the various stomach worms and intestinal worms of sheep, stomach worms and nodular worms of cattle, strongyles in horses, and various other worms in these and other animals.

I have discovered that zinc stearate is a powerful larvicide for horn fly larvae.

The advantages realized by using zinc stearate for internal medication include effective larvicidal properties against such insects as horn flies.

In tests with zinc stearate for internal medication the chemical was mixed with bran and fed to cattle. In daily doses of 4 grams of zinc stearate per hundredweight of the animal, no horn fly larvae developed in the droppings after the second dose.

It is distinctly intended and implied the words "insecticide" and "larvicide" and words of similar import are meant to include a substance not only toxic to insects, but also toxic to certain other arthropods, annelids, nemathelminths, platyhelminths, and protozoa.

Having thus described my invention, what I claim for Letters Patent is:

The method of controlling larvae which breed in animal droppings comprising adding to the feed of the animal zinc stearate.

WESLEY G. BRUCE.